US010844673B2

(12) United States Patent
Melo et al.

(10) Patent No.: US 10,844,673 B2
(45) Date of Patent: Nov. 24, 2020

(54) FIBER REINFORCED AND POWERED COIL TUBING

(71) Applicant: Saudi Arabian Oil Company, Dhahran (SA)

(72) Inventors: Rafael Adolfo Lastra Melo, Dhahran (SA); Jinjiang Xiao, Dhahran (SA); Brian A. Roth, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/678,942

(22) Filed: Aug. 16, 2017

(65) Prior Publication Data
US 2018/0058157 A1    Mar. 1, 2018

Related U.S. Application Data

(60) Provisional application No. 62/381,933, filed on Aug. 31, 2016.

(51) Int. Cl.
*E21B 17/00*    (2006.01)
*E21B 17/20*    (2006.01)
(Continued)

(52) U.S. Cl.
CPC ............ *E21B 17/206* (2013.01); *E21B 19/22* (2013.01); *E21B 41/0085* (2013.01); *F16L 11/02* (2013.01)

(58) Field of Classification Search
CPC .... E21B 17/206; E21B 19/22; E21B 41/0085; F16L 11/127
(Continued)

(56) References Cited

U.S. PATENT DOCUMENTS

| 646,887 A | 4/1900 | Stowe |
| 4,336,415 A | 6/1982 | Walling |
(Continued)

FOREIGN PATENT DOCUMENTS

| EP | 1143104 | 10/2001 | |
| GB | 2173034 A | * 10/1986 | ........... G02B 6/4415 |
| GB | 2283035 | 4/1995 | |

OTHER PUBLICATIONS

International Search Report and Written Opinion issued in International Application No. PCT/US2017/049001 dated Dec. 22, 2017; 13 pages.
(Continued)

*Primary Examiner* — Janine M Kreck
(74) *Attorney, Agent, or Firm* — Fish & Richardson P.C.

(57) ABSTRACT

Examples of fiber reinforced and powered coil tubing include a hollow fiber reinforced composite coiled tubing with a tubing wall having an inner surface, an outer surface and a wall thickness. The inner surface is formed to prevent absorption of fluids flowed through the coiled tubing to the tubing wall. The tubing can connect a power source at a surface of a wellbore to downhole equipment positioned within the wellbore. An electrical power conductor is embedded in the tubing wall. The conductor can transfer power from the power source to the downhole equipment. The tubing can be used to lower, install and remove downhole equipment into the wellbore without a work-over rig. The downhole equipment can be operated by transmitted power through the electrical power conductor.

19 Claims, 5 Drawing Sheets

(51) Int. Cl.
*E21B 19/22* (2006.01)
*E21B 41/00* (2006.01)
*F16L 11/02* (2006.01)

(58) Field of Classification Search
USPC .......................................................... 392/301
See application file for complete search history.

(56) References Cited

U.S. PATENT DOCUMENTS

| | | |
|---|---|---|
| 4,374,530 A | 2/1983 | Walling |
| 4,476,923 A | 10/1984 | Walling |
| 4,619,323 A | 10/1986 | Gidley |
| 4,662,437 A * | 5/1987 | Renfro ................... E21B 17/00 166/248 |
| 5,180,014 A | 1/1993 | Cox |
| 5,269,377 A | 12/1993 | Martin |
| 5,285,008 A | 2/1994 | Sas-Jaworsky et al. |
| 5,334,801 A | 8/1994 | Mohn |
| 5,908,049 A | 6/1999 | Williams et al. |
| 5,921,285 A | 7/1999 | Quigley et al. |
| 6,148,866 A | 11/2000 | Quigley et al. |
| 6,179,269 B1 * | 1/2001 | Kobylinski ........... E21B 17/206 254/134.3 R |
| 6,192,983 B1 | 2/2001 | Neuroth et al. |
| 6,257,332 B1 | 7/2001 | Vidrine et al. |
| 6,286,558 B1 | 9/2001 | Quigley et al. |
| 6,298,917 B1 | 10/2001 | Kobylinski et al. |
| 6,357,485 B2 | 3/2002 | Quigley et al. |
| 6,414,239 B1 * | 7/2002 | Gasque, Jr. .......... H01B 7/0018 174/105 R |
| 6,604,550 B2 | 8/2003 | Quigley et al. |
| 6,857,452 B2 | 2/2005 | Quigley et al. |
| 6,863,137 B2 | 3/2005 | Terry et al. |
| 7,647,948 B2 | 1/2010 | Quigley et al. |
| 7,670,451 B2 | 3/2010 | Head |
| 7,849,928 B2 | 12/2010 | Collie |
| 7,905,295 B2 | 3/2011 | MacK |
| 3,066,033 A1 | 11/2011 | Quigley et al. |
| 2011/0036568 A1 * | 2/2011 | Barbosa Alves ....... E21B 17/10 166/250.01 |
| 2018/0226174 A1 * | 8/2018 | Rose .................. H01B 13/0006 |

OTHER PUBLICATIONS

Gulf Cooperation Council Examination Report issued in GCC Application No. GC 2017-33912 dated Feb. 23, 2019, 5 pages.
Gulf Cooperation Council Examination Report issued in GCC Application No. GC 2017-33912 dated Jun. 27, 2019 5 pages.
Gulf Cooperation Council Examination Report issued in GCC Application No. GC2017-33912 dated Oct. 13, 2019, 3 pages.

\* cited by examiner

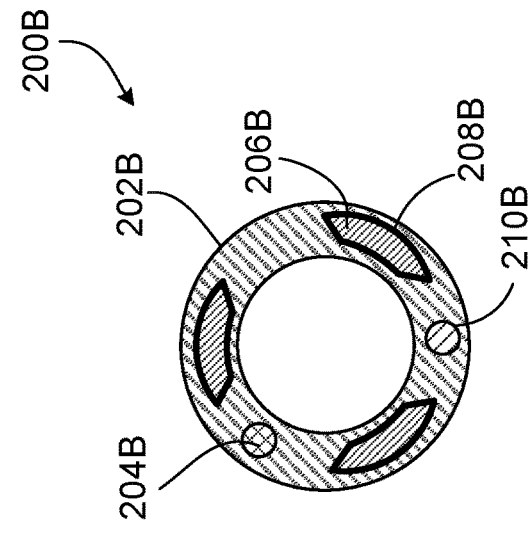
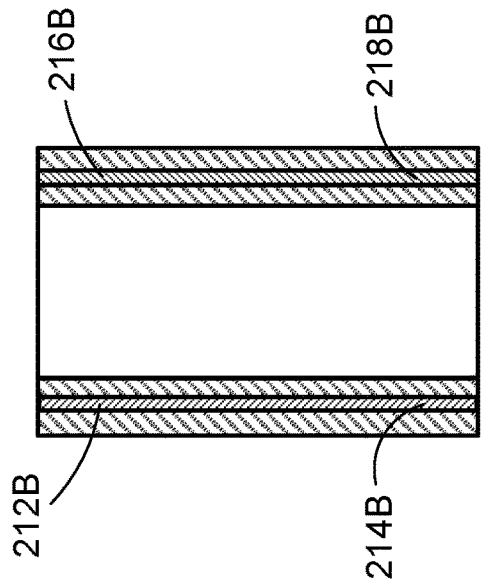
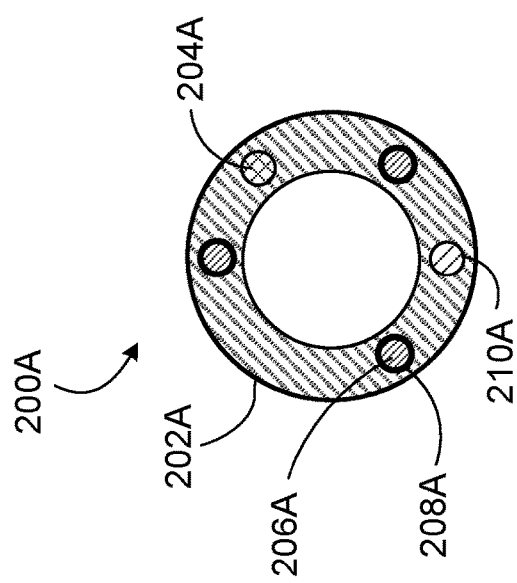
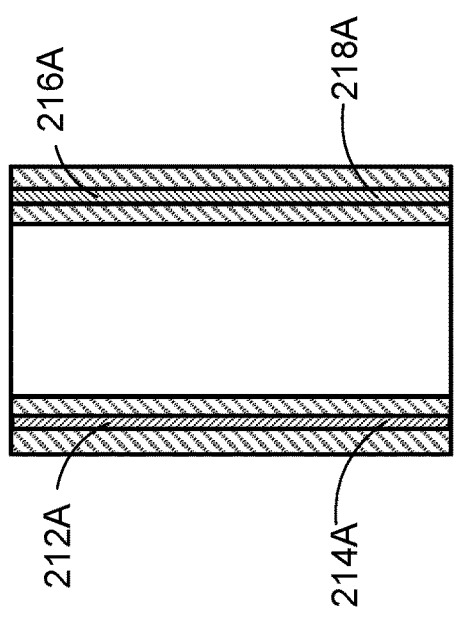
FIG. 2A
FIG. 2B

FIBER REINFORCED AND POWERED COIL TUBING

TECHNICAL FIELD

This disclosure relates to tubing used in hydrocarbon reservoir operations, for example, wellbore production operations.

BACKGROUND

Traditional deployment of downhole production equipment, such as an electric submersible pump, entails the installation of the equipment at the end of a production tubing with a power cable strapped to the tubing using steel bands or cross coupling cable protectors. When the equipment fails, a work-over rig is required to pull out the tubing and replace the failed equipment because the typical production tubing does not have sufficient strength to remove the equipment. Work-over rigs are costly, especially offshore. The lead-time for rigs can be as long as six to twelve months, leading to significant production deferral.

SUMMARY

This disclosure describes technologies related to fiber reinforced and powered coil tubing.

An example implementation of the subject matter described within this disclosure is a tubing assembly with the following features. A hollow fiber reinforced composite coiled tubing includes a tubing wall with an inner surface, an outer surface and a wall thickness. The inner surface is formed to prevent absorption of fluids flowed through the coiled tubing to the tubing wall. The coiled tubing includes a first tubing end and a second tubing end. The tubing is configured to connect a power source at a surface of a wellbore to downhole equipment positioned within the wellbore. An electrical power conductor is embedded within the tubing wall. The conductor is configured to transfer power from the power source to the downhole equipment. The electrical power conductor has a non-circular cross-section. A thickness of the electrical power conductor along a radius of the tubing is less than the wall thickness. The electrical power conductor extends circumferentially within the wall thickness.

Aspects of the example implementation, which can be combined with the example implementation alone or in combination, include the following. A communication line is embedded in the tubing wall. The communication line is capable of transferring control signals from a surface of the wellbore to the downhole equipment.

Aspects of the example implementation, which can be combined with the example implementation alone or in combination, include the following. The communication line includes at least one of a data communication line capable of transmitting data through the fiber reinforced composite coiled tubing to the downhole equipment, a control line capable of carrying control fluid through the fiber reinforced composite coiled tubing to the downhole equipment, or a control line capable of transmitting control signals through the fiber reinforced composite coiled tubing to the downhole equipment.

Aspects of the example implementation, which can be combined with the example implementation alone or in combination, include the following. The fiber reinforced coil tubing has a strength sufficient to carry a weight of the downhole equipment.

Aspects of the example implementation, which can be combined with the example implementation alone or in combination, include the following. An encapsulation encapsulates the electrical power conductor.

Aspects of the example implementation, which can be combined with the example implementation alone or in combination, include the following. A material with which the electrical power conductor is encapsulated is at least one of an insulating material, a corrosion resistant material, or mechanical protection material.

Aspects of the example implementation, which can be combined with the example implementation alone or in combination, include the following. The material includes a dielectric material.

Aspects of the example implementation, which can be combined with the example implementation alone or in combination, include the following. The material includes at least one of polypropylene, ethylene propylene diene monomer (EPDM), or nitrile rubber.

Aspects of the example implementation, which can be combined with the example implementation alone or in combination, include the following. The supplemental protective layer includes one or more layers of at least one of tapes, braids, extruded barriers, or laser welded tubes.

An example implementation of the subject matter described within this disclosure is a method with the following features. A first tubing end of a coiled tubing is attached to a power source. The coiled tubing has been formed using fiber reinforced composite. The fiber reinforced composite coiled tubing includes a tubing wall having an inner surface and an outer surface. The inner surface is formed to prevent absorption of fluids flowed through the coiled tubing to the tubing wall. The coiled tubing is configured to connect a power source at a surface of a wellbore to downhole equipment positioned within the wellbore. An electrical power conductor is embedded in the tubing wall. The conductor is capable of transferring power from the power source to the downhole equipment. The electrical power conductor has a non-circular cross-section. A thickness of the electrical power conductor along a radius of the tubing is less than the wall thickness. The electrical power conductor extends circumferentially within the wall thickness. A second tubing end of the coiled tubing is attached to the downhole equipment. The downhole equipment is operating inside the wellbore.

Aspects of the example method, which can be combined with the example method alone or in combination, include the following. The downhole equipment is lowered into the wellbore with the coiled tubing.

Aspects of the example method, which can be combined with the example method alone or in combination, include the following. Power is transmitted from the power source to the downhole equipment through the embedded electrical power conductor. The downhole equipment is operated.

Aspects of the example method, which can be combined with the example method alone or in combination, include the following. Operating the downhole equipment includes operating an artificial lift system. A production fluid is produced through the fiber reinforced coil tubing.

Aspects of the example method, which can be combined with the example method alone or in combination, include the following. The downhole equipment includes and electric submersible pump or a wet gas compressor.

Aspects of the example method, which can be combined with the example method alone or in combination, include the following. The fiber reinforced coil tubing is hung from a wellhead at the surface of the wellbore.

Aspects of the example method, which can be combined with the example method alone or in combination, include the following. The downhole equipment is supported with the coiled tubing.

Aspects of the example method, which can be combined with the example method alone or in combination, include the following. The downhole equipment is removed from inside the wellbore with the coiled tubing.

An example implementation of the subject matter described within this disclosure is a method with the following features. A hollow fiber reinforced composite coiled tubing includes a tubing wall having an inner surface, an outer surface, and a wall thickness. The inner surface is formed to prevent absorption of fluids flowed through the coiled tubing to the tubing wall. The coiled tubing includes a first tubing end and a second tubing end. The tubing is configured to connect a power source at a surface of a wellbore to downhole equipment positioned within the wellbore. An electrical power conductor is embedded in the tubing wall. The conductor is configured to transfer power from the power source to the downhole equipment. The electrical power conductor has a non-circular cross-section. a thickness of the electrical power conductor along a radius of the tubing is less than the wall thickness. The electrical power conductor extends circumferentially within the wall thickness. A power source is positioned at a surface of the wellbore. The power source is configured to power an artificial lift system. An artificial lift system is positioned at a downhole end of the hollow fiber reinforced composite coiled tubing.

Aspects of the example system, which can be combined with the example implementation alone or in combination, include the following. The artificial lift system includes an electric submersible pump (ESP) or a wet gas compressor.

Aspects of the example system, which can be combined with the example implementation alone or in combination, include the following. A communication line is embedded in the tubing wall. The communication line is capable of transferring control signals from a surface of the wellbore to the downhole equipment.

The details of one or more implementations of the invention are set forth in the accompanying drawings and the description below. Other features, objects, and advantages will be apparent from the description and drawings, and from the claims.

BRIEF DESCRIPTION OF DRAWINGS

FIG. 2A is a schematic diagram showing a first example of a cross-section of a fiber reinforced coiled tubing.

FIG. 2B is a schematic diagram showing a second example of a cross-section of a fiber reinforced coiled tubing.

Like reference symbols in the various drawings indicate like elements.

DETAILED DESCRIPTION

This disclosure describes a fiber reinforced composite powered coiled tubing for use in a wellbore during wellbore operations, for example, production operations, drilling operations or other wellbore operations. This fiber reinforced composite powered coiled tubing can be used to power downhole equipment such as an electric submersible pump (ESP), submersible wet gas compressor or other downhole equipment. The fiber reinforced composite powered coiled tubing has a high tensile strength as to have the ability to support the weight of downhole equipment. The tensile strength is higher than non-fiber reinforced tubing. The inner and outer surfaces of the fiber reinforced composite powered coiled tubing are smooth. The inner and the outer surface of the fiber reinforced composite powered coiled tubing form a tubing wall. An electrical power conductor is embedded and encased in a protective casing within the tubing wall. The electrical power conductor is used to transfer electrical power from a source on the surface to downhole equipment. The tubing wall can also include a control line that is, for example, hydraulic or electrical in nature. A communication line can also be embedded within the tubing wall that is, for example, either electrical or optical in nature.

By utilizing the fiber reinforced composite powered coiled tubing described here, large and heavy pieces of downhole equipment, such as an ESP, a submersible wet gas compressor or other downhole equipment, can be deployed and serviced without a work-over rig. The design of the fiber reinforced composite powered coiled tubing has sufficient mechanical strength to carry the weight of the downhole equipment and eliminates the need for a work-over rig.

Figure 1:
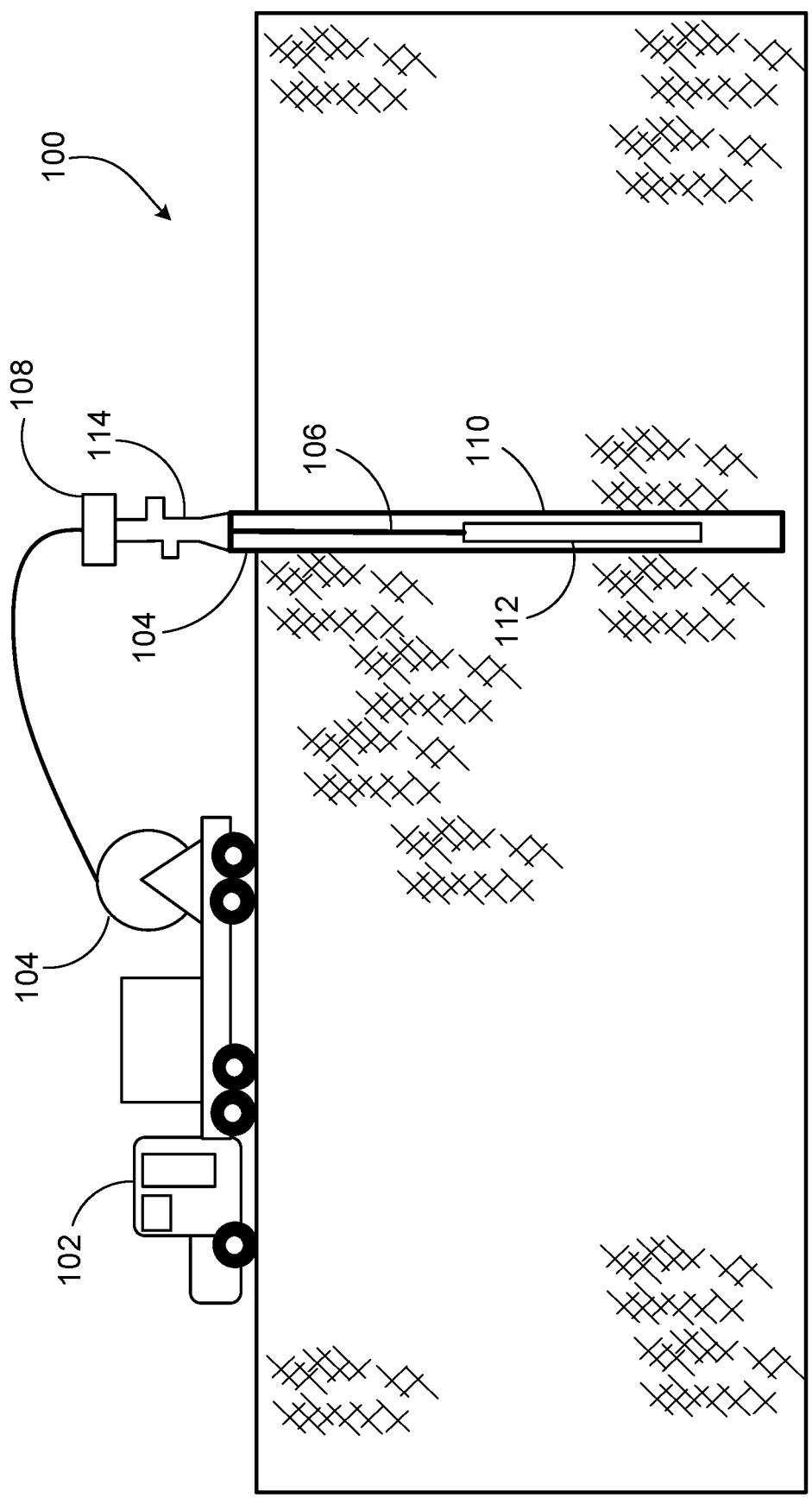
FIG. 1 is a schematic diagram showing a fiber reinforced coiled tubing used to change a component in a wellbore using a coil tubing truck.

FIG. 1 is a schematic diagram showing a fiber reinforced coiled tubing 106 used to change a component in a wellbore using a coil tubing truck. The tubing 106 can be deployed without a work-over rig. In FIG. 1, the tubing 106 is deployed using a coiled tubing truck 102. The coiled tubing truck 102 is positioned next to the wellhead 114. The fiber reinforced powered coiled tubing 106 is brought to the site on a spool 104 positioned on a truck. This spool 104 is able to retract and extend the fiber reinforced powered coiled tubing 106 through the injection assembly 108, which includes blow-out preventer (BOP) and, in some instances, a lubricator, and into the wellbore 110. The fiber reinforced composite powered coiled tubing 106 is flexible enough to be deployed on a conventional spool 104 without deformation, cracking, or delamination. The fiber reinforced composite powered coiled tubing 106 carries the weight of a downhole component, for example, an ESP assembly 112, during installation or change-out of the downhole component, each of which is implemented with the fiber reinforced composite powered coiled tubing 106 supporting the weight of the equipment. While the fiber reinforced composite powered coiled tubing 106 is strong enough to carry the downhole equipment, the tubing 106 can also be sheared by a BOP in the event of a blow-out. A similar set-up can be used in off-shore applications.

FIGS. 2A and 2B show examples of cross-sections of the fiber reinforced coiled tubing 106. The fiber reinforced composite powered coiled tubing 106 is formed using a fiber reinforced composite made from fiber material chosen depending on the operating temperatures in the downhole environment. Examples of the fiber materials include carbon fiber, Kevlar™, Vectran™, other fibers or combinations of them together with resin, epoxy, PEEK or other similar polymeric materials. Fiber composite powered coiled tubing 106 manufacturing, including the addition of conductor 206A/B and other lines, can be done by pultrusion, over extrusion, tape winding and sintering, or other methods known to those with the skill of the art.

FIG. 2A shows an example configuration 200A of a cross-section of the fiber reinforced composite coiled tubing 106. 202A of the fiber reinforced composite powered coiled tubing 106 is the wall. An electrical power conductor 206A is embedded in the fiber reinforced powered coiled tubing wall 202A. The electrical power conductor can also be sheathed in protective layers 208A to insulate the electrical conductor, protect it from mechanical damage, and protect it from corrosion. The protective layer can include but is not limited to polypropylene, ethylene propylene-diene (EPD) ter-polymer, or nitrile rubber. Once the conductor 206A is sheathed, it is often further covered by an additional protective layer of tapes, braids, extruded barriers, or laser welded tubes. The wall 202A of the fiber reinforced composite powered coiled tubing 106 can also contain a control line 204A and communication line 210A. The control line 204A can be either hydraulic tubing or electrical conductors while communication line 210A can be either fiber optic or electrical conductors. The control line 204A sends command signals to the down-hole equipment while the communication line 210A can carry signals from down-hole components and instruments to surface facilities. All components that are embedded in the fiber reinforced composite powered coiled tubing wall 202A extend through the entire length of the tubing 106 and terminate at the ends of the fiber reinforced composite powered coiled tubing 106. The communication 210A line and control line 204A have a first end 212A and second end 214A that coincides with the ends of the fiber reinforced composite powered coiled tubing 106. The electrical power conductor 206B has a first end 216A and second end 218A that coincides with the ends of the fiber reinforced composite powered coiled tubing 106.

FIG. 2B shows an alternative example cross-section 200B. In this configuration, the electrical power conductor 206B contours to the shape of the fiber reinforced composite powered coiled tubing's walls 202B. The contoured power conductor 206B can allow for a smaller overall cross-section of the fiber reinforced composite power coiled tubing 106. The contoured shape also allows for greater allowable current flow through the conductor 206B and allows for more efficient heat dissipation when compared to conductors with circular cross-sections. The control line 204B, protective layers 208B, the communication line 210B, the first end of the communication or control line 212B, the second end of the communication or control line 214B, the first end of the electrical power conductor 216B, and the second end of the electrical power conductor 218B are similar to the control line 204A, protective layers 208A, the communication line 210A, the first end of the communication or control line 212A, the second end of the communication or control line 214A, the first end of the electrical power conductor 216A, and the second end of the electrical power conductor 218A respectively.

The inner area of the fiber reinforced composite powered coiled tubing 106 carries production fluids from the downhole equipment back up to the surface. The fiber reinforced composite powered coiled tubing 106 is formed with a tight enough weave to prevent absorption of the production fluids. The fiber reinforced composite powered coiled tubing 106 is also designed such that it has a high resistance to corrosion and erosion from production fluids, chemicals, and particulates, and is resilient to temperatures common in a downhole environment.

Figure 3:
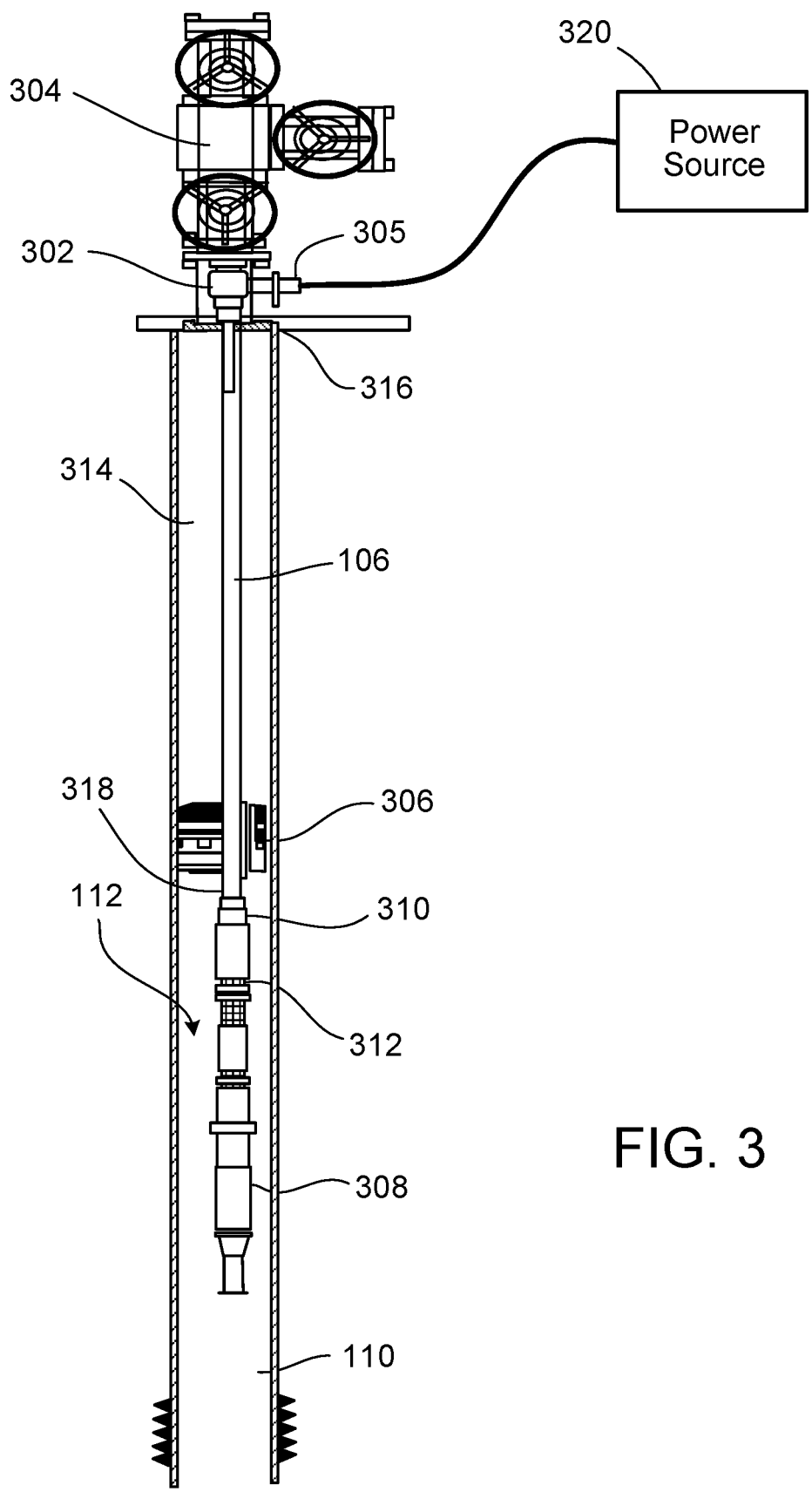
FIG. 3 is a schematic diagram showing an example of a fiber reinforced coiled tubing supporting a component downhole with the coiled tubing hanging off of the wellhead.

FIG. 3 shows an example of an ESP assembly installed within a wellbore. The fiber reinforced powered coiled tubing 106 connects to the ESP assembly 112 at the downhole end and is supported and terminated at the surface end by a tubing hanger 302. Power, control, and communication systems are connected to the fiber reinforced composite powered coiled tubing 106 at the surface termination 305 point at the tubing hanger 302. The tubing hanger is connected at the up-hole end 316 of the tubing. The tubing hanger 302 also contains pressure containing seals to isolate the inner and outer parts of the fiber reinforced composite powered coiled tubing 106 from one another. A tree 304 is mounted atop the wellhead that routes the production fluids from the fiber reinforced powered coiled tubing 106 to the surface production facilities. The downhole end 318 of the fiber reinforced composite powered coiled tubing 106 is terminated into the ESP assembly 112 at the power and flow crossover 310. Power-conductors, control lines, or communication lines (or combinations of them), such as those described with reference to FIGS. 2A and 2B, are connected to the ESP assembly 112 for operation. The power-conductor 206A or power-conductor 206B sends power to the motor 308 from a topside power source 320 during operations. The motor 308 is directly coupled to a pump-head 312 and is fully immersed in the production fluids. In some cases, the motor 308 and the pump-head 312 may be inverted such that the motor is above the pump-head making connection of the motor to the downhole end 318 of the fiber reinforced composite powered coiled tubing 106. An expandable packer 306 can be positioned at either the up-hole or the downhole end of the ESP assembly and is utilized to direct flow from the wellbore 110 into the ESP assembly 112. The annulus 314 up-hole of the packer 306 should be free of production fluids if the packer 306 and the tubing hanger 302 are functioning properly. The annulus 314 is defined as the space between the outer tubing wall (for example, 202A or 202B) and the inner wall of the wellbore 110.

Figure 4:
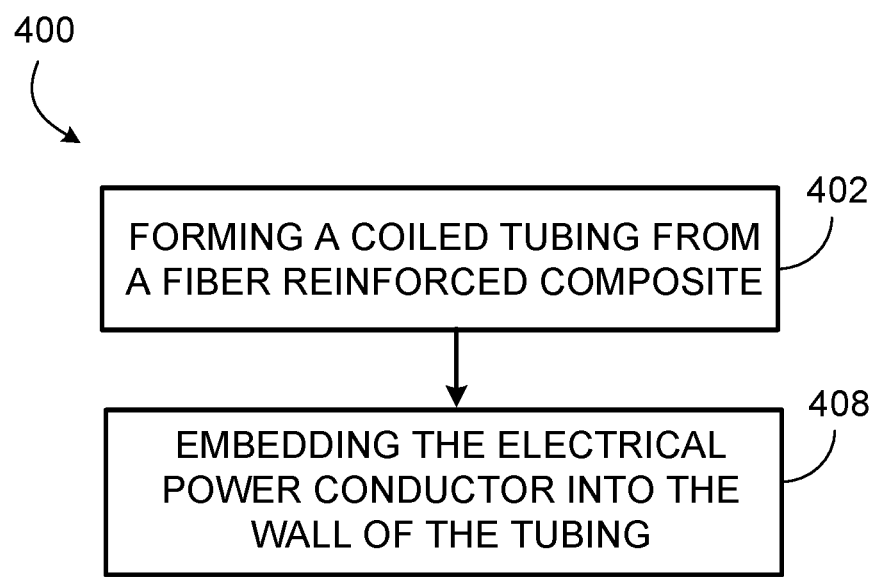
FIG. 4 is a flowchart of an example process for forming the coiled tubing.

FIG. 4 shows a flowchart describing method 400 of constructing the fiber reinforced composite powered coiled tubing 106. The process 400 can be implemented by a manufacturer of a coiled tubing for use in wellbore operations. At 402, a coiled tubing is formed from a fiber reinforced composite. The fiber reinforced composite coiled tubing includes a tubing wall (for example, 202A or 202B) having an inner surface and an outer surface. The inner surface is formed to prevent absorption of fluids flowed through the coiled tubing to the tubing wall (for example, 202A or 202B). The coiled tubing 106 is configured to connect a power source 320 at a surface of a wellbore to downhole equipment positioned within the wellbore. At 408, an electrical power conductor (for example, 206A or 206B) is embedded into the tubing wall (for example, 202A or 202B). The conductor (for example, 206A or 206B) is configured to transfer power from the power source 320 to the downhole equipment 112.

Figure 5:
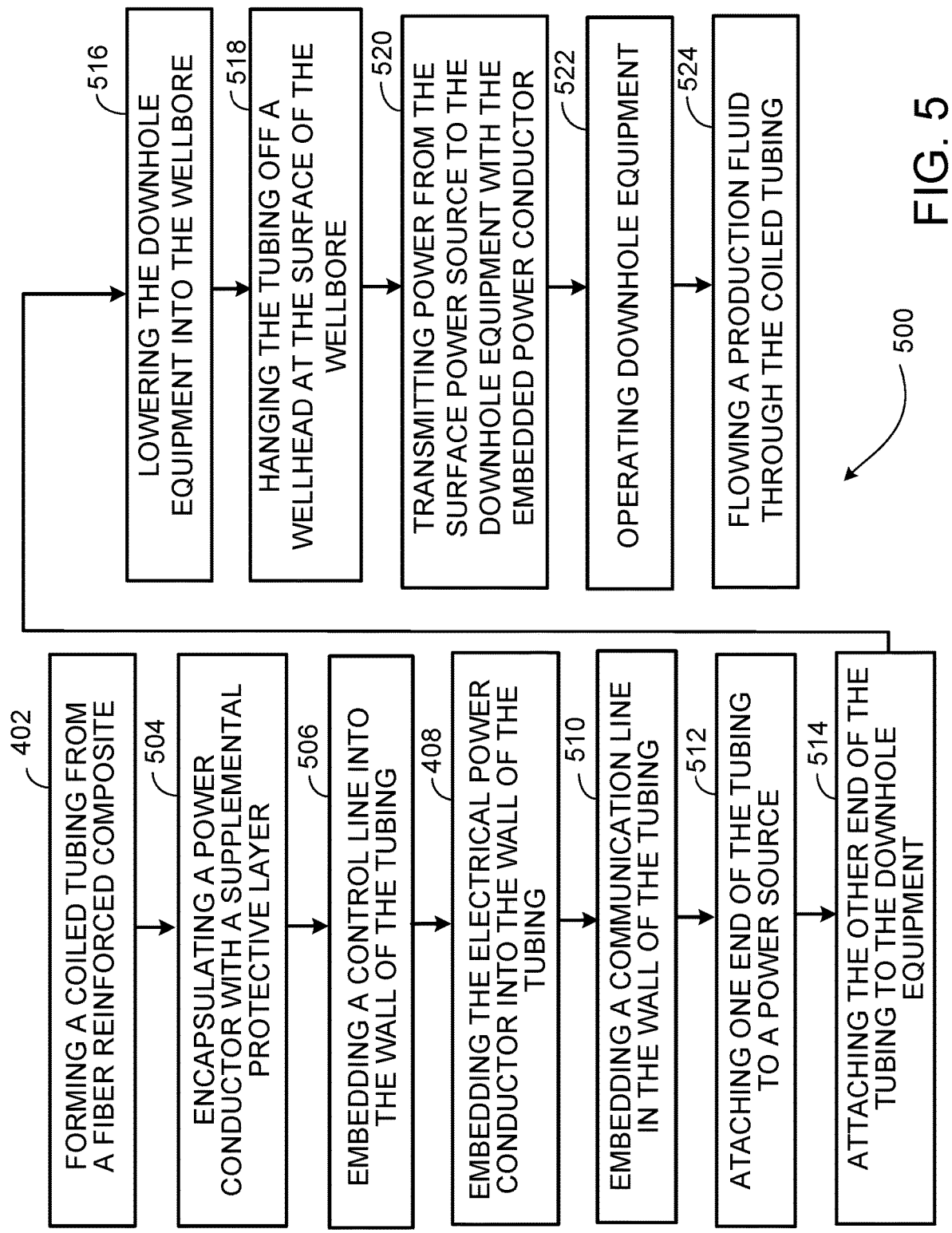
FIG. 5 is a flowchart of an example process for forming and using the coiled tubing.

FIG. 5 shows a flowchart describing method 500 of using the fiber reinforced composite powered coiled tubing 106. At 402, a coiled tubing is formed from a fiber reinforced composite. At 504, a power conductor is encapsulated with a supplemental protective layer. At 506, a control line (for example, 204A or 204B) is embedded into the wall of the tubing. At 408, and electrical power conductor (for example, 206A or 206B) is embedded into the wall (for example, 202A or 202B) of the tubing 106. At 510 a communication line (for example 210A or 210B) is embedded in the wall (for example, 202A or 202B) of the tubing 106. At 512 one end of the tubing 106 is attached to a power source 320. At 514, the other end of the tubing 106 is attached to the downhole equipment 112. At 516, the downhole equipment 112 is lowered into a wellbore 110. At 518, the tubing 106 is hung off of a wellhead at the surface of a wellbore 110. At 520, power is transmitted from the surface through the embedded power conductor (for example 206A or 206B) to the downhole equipment 112. At 522, the downhole equipment 112 is operated. At 524, production fluid flows through the coiled tubing 106.

A number of implementations of the invention have been described. Nevertheless, it will be understood that various modifications may be made without departing from the spirit and scope of the invention. For example, the fiber reinforced composite powered coiled tubing 106 could be utilized in conjunction with an electric submersible wet gas compressor. Accordingly, other implementations are within the scope of the following claims.

What is claimed is:

1. A tubing assembly comprising:
a hollow fiber reinforced composite coiled tubing comprising a tubing wall having an inner surface made of the fiber reinforced composite, an outer surface and a wall thickness, the coiled tubing made of fiber reinforced composite woven to define an inner area through which fluids are flowed through the coiled tubing, the inner area of the coiled tubing formed with a weave of sufficient tightness to prevent absorption of fluids flowed through the inner area, the coiled tubing comprising a first tubing end and a second tubing end, the tubing configured to connect a power source at a surface of a wellbore to downhole equipment positioned within the wellbore;
an electrical power conductor embedded in the tubing wall, the conductor configured to transfer power from the power source to the downhole equipment, the electrical power conductor having a non-circular cross-section, wherein a thickness of the electrical power conductor along a radius of the tubing is less than the wall thickness, wherein the electrical power conductor extends circumferentially within the wall thickness; and
an encapsulation encapsulating the electrical power conductor, wherein the electrical power conductor is encapsulated by the encapsulation before embedding the electrical power conductor in the tubing wall.

2. The assembly of claim 1, further comprising a communication line embedded in the tubing wall, the communication line configured to transfer control signals from a surface of the wellbore to the downhole equipment.

3. The assembly of claim 2, wherein the communication line comprises at least one of a data communication line configured to transmit data through the fiber reinforced composite coiled tubing to the downhole equipment, a control line configured to carry control fluid through the fiber reinforced composite coiled tubing to the downhole equipment or a control line configured to transmit control signals through the fiber reinforced composite coiled tubing to the downhole equipment.

4. The assembly of claim 1, wherein the fiber reinforced coil tubing has a strength sufficient to carry a weight of the downhole equipment.

5. The assembly of claim 1, wherein a material with which the electrical power conductor is encapsulated is at least one of an insulating material, a corrosion resistant material or mechanical protection material.

6. The assembly of claim 5, wherein the material comprises a dielectric material.

7. The assembly of claim 5, wherein the material comprises at least one of polypropylene, ethylene propylene diene monomer (EPDM) or nitrile rubber.

8. The assembly of claim 5, further comprising a supplemental protective layer covering the encapsulation, wherein the supplemental protective layer comprises a plurality of layers of at least one of tapes, braids, extruded barriers, or laser welded tubes.

9. A method comprising:
forming a coiled tubing using fiber reinforced composite, wherein the fiber reinforced composite coiled tubing comprises a tubing wall having an inner surface and an outer surface, the inner surface made of fiber reinforced composite, wherein the fiber reinforced composite is woven to define an inner area through which fluids are flowed through the coiled tubing, the inner area of the coiled tubing formed with a weave of sufficient tightness to prevent absorption of the fluids flowed through the inner area, the coiled tubing configured to connect a power source at a surface of a wellbore to downhole equipment positioned within the wellbore;
encapsulating an electrical power conductor in at least one of an insulating material, a corrosion resistant material or mechanical protection material;
embedding the electrical power conductor in the tubing wall, wherein the electrical power conductor is encapsulated before embedding the electrical power conductor in the tubing wall;
attaching a first tubing end of the coiled tubing to the power source;
attaching a second tubing end of the coiled tubing to the downhole equipment, the conductor configured to transfer power from the power source to the downhole equipment, the electrical power conductor having a non-circular cross-section, wherein a thickness of the electrical power conductor along a radius of the tubing is less than the wall thickness, wherein the electrical power conductor extends circumferentially within the wall thickness; and
operating the downhole equipment inside the wellbore.

10. The method of claim 9, wherein the method further comprises lowering the downhole equipment into the wellbore with the coiled tubing.

11. The method claim 9, further comprising:
transmitting power from the power source to the downhole equipment through the embedded electrical power conductor; and
operating the downhole equipment.

12. The method of claim 11, wherein operating the downhole equipment comprises operating an artificial lift system, and wherein the method comprises producing a production fluid through the fiber reinforced coil tubing.

13. The method of claim 9, wherein the downhole equipment comprises an electric submersible pump or a wet gas compressor.

14. The method of claim 9, further comprising hanging the fiber reinforced coil tubing from a wellhead at the surface of the wellbore.

15. The method of claim 9, further comprising supporting the downhole equipment with the coiled tubing.

16. The method of claim 9, further comprising removing the downhole equipment from inside the wellbore with the coiled tubing.

17. A system comprising:
a hollow fiber reinforced composite coiled tubing comprising a tubing wall having an inner surface, an outer surface and a wall thickness, the coiled tubing made of fiber reinforced composite woven to define an inner area through which fluids are flowed through the coiled tubing, the inner area of the coiled tubing formed with a weave of sufficient tightness to prevent absorption of the fluids flowed through the inner area, the coiled tubing comprising a first tubing end and a second tubing end, the tubing configured to connect a power source at a surface of a wellbore to downhole equipment positioned within the wellbore; and an electrical power conductor embedded in the tubing wall, the conductor configured to transfer power from the power source to the downhole equipment, the electrical power conductor having a non-circular cross-section, wherein a thickness of the electrical power conductor along a radius of the tubing is less than the wall thickness, wherein the electrical power conductor extends circumferentially within the wall thickness;

an encapsulation encapsulating the electrical power conductor, wherein the electrical power conductor is encapsulated by the encapsulation before embedding the electrical power conductor in the tubing wall;

a power source positioned at a surface of the wellbore, the power source configured to power an artificial lift system; and an artificial lift system positioned at a downhole end of the hollow fiber reinforced composite coiled tubing.

18. The system of claim 17, wherein the artificial lift system comprises an electric submersible pump (ESP) or a wet gas compressor.

19. The system of claim 17, further comprising a communication line embedded in the tubing wall, the communication line configured to transfer control signals from a surface of the wellbore to the downhole equipment.

\* \* \* \* \*

UNITED STATES PATENT AND TRADEMARK OFFICE
CERTIFICATE OF CORRECTION

PATENT NO. : 10,844,673 B2
APPLICATION NO. : 15/678942
DATED : November 24, 2020
INVENTOR(S) : Rafael Adolfo Lastra Melo, Jinjiang Xiao and Brian A. Roth Page 1 of 1

It is certified that error appears in the above-identified patent and that said Letters Patent is hereby corrected as shown below:

In the Claims

Column 8, Line 14, Claim 11, after "method" insert -- of --

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*